United States Patent [19]
Schlich

[11] Patent Number: 4,993,624
[45] Date of Patent: Feb. 19, 1991

[54] TWO-WAY BAR CODE WINDOW ENVELOPE

[75] Inventor: John H. Schlich, Louisville, Ky.

[73] Assignee: National Service Industries, Inc., Atlanta, Ga.

[21] Appl. No.: 514,953

[22] Filed: Apr. 26, 1990

[51] Int. Cl.$^5$ .................. B65D 27/04; B65D 27/06
[52] U.S. Cl. ................................ 229/71; 229/73
[58] Field of Search .................. 229/71, 73, 69, 92.3

[56] References Cited

U.S. PATENT DOCUMENTS

| | | | |
|---|---|---|---|
| 1,264,451 | 4/1918 | Swift | 229/71 |
| 3,411,699 | 11/1968 | Pine et al. | 229/69 |
| 3,531,628 | 9/1970 | White, Jr. | 229/71 X |
| 3,946,939 | 3/1976 | Kranz | 229/73 |
| 3,982,689 | 9/1976 | Retrum | 229/71 |
| 4,072,264 | 2/1978 | Kranz | 229/72 |
| 4,288,028 | 9/1981 | Diaz | 229/71 X |
| 4,384,670 | 5/1983 | Dicker | 229/69 |
| 4,418,865 | 12/1983 | Bowen | 229/69 |
| 4,747,535 | 5/1988 | Haase et al. | 229/69 |

Primary Examiner—Stephen Marcus
Assistant Examiner—Jes F. Pascua
Attorney, Agent, or Firm—Mason, Fenwick & Lawrence

[57] ABSTRACT

A two-way reusable envelope useful for commercial mass-mailings is disclosed. The envelope includes a window aligned along the bottom right-hand edge of the front envelope panel, thereby enabling standard Postal Service zip code bar code markings to be visible during both trips of the two-way envelope. The envelope additionally includes a two-portion closure flap which enables Facing Identification Marks and appropriate postage to be visible from the front of the envelope only during one trip as appropriate.

8 Claims, 2 Drawing Sheets

TWO-WAY BAR CODE WINDOW ENVELOPE

FIELD OF THE INVENTION

The present invention relates to window envelopes, particularly window envelopes adapted for use both as a sending and return envelope. Specifically, the present invention relates to two-way window envelopes having a transparent window disposed in the lower front panel of the envelope for displaying a postal bar code.

BACKGROUND OF THE INVENTION

Many commercial companies which issue invoices for payment by customers have attempted to provide convenient means for mailing invoices to customers and simultaneously providing a return envelope which the customer may use for mailing back payment. One way of accomplishing this goal is using a "two-way envelope," which includes a pocket and sealable flap for sending first contents to the customer, and means for refolding and sealing the envelope a second time when the customer desires to return payment to the company. For example, U.S. Pat. No. 3,152,751 (Hiersteiner) discloses a combined two-way envelope and enclosure provided with a top flap 13 divided into two narrow flaps by a transverse fold line 16 and a perforation line 17 thereon. When the envelope is mailed to the customer, as shown in FIGS. 3 and 4, flap 13 is folded along lines 16 and sealed using gum 19. Thereafter, as shown in FIGS. 5 and 6, the customer may remove flap portion 15 by tearing along perforation 17, folding flap 14 along line 11 and sealing flap 14 using gummed area 18. Hiersteiner discloses provision of a window in the lower left portion of the front panel, through which the address of the customer or the company may be displayed. However, as fully discussed below, the window provided by Hiersteiner is incompatible with modern automated postal sorting equipment.

Other examples of two-way envelopes having windows incompatible with today's automated postal sorting equipment include U.S. Pat. No. 3,946,938 (Krantz), 4,072,264 (Krantz), and 4,180,168 (Hiersteiner).

A two-way envelope having a business reply panel is shown in U.S. Pat. No. 4,565,317 (Krantz). In FIG. 1, the '317 patent to Krantz shows an envelope window 9 defined by rectangular space 8 through which an address 68 and bar code 69 may be viewed. The bar code 69 of the '317 patent is an obsolete form of postal bar code marking formerly utilized by the U.S. Postal Service. As shown in FIGS. 4 and 5, the Krantz '317 patent discloses use of a large folding panel provided with a return address and business reply mail markings which the customer may fold down onto the front of the envelope to facilitate return to the company.

The foregoing prior art envelopes include a common deficiency: incompatibility with modern postal automated sorting equipment. The automated sorting equipment presently used by the United States Postal Service requires bar code markings in two specific portions of an envelope. First, a Facing Identification Mark (FIM) must be placed on the right top edge portion of the front envelope panel adjacent, to the postage stamp or meter marking. The FIM mark is scanned by automated Postal Service equipment to determine what class and type of mail is represented by the envelope.

Second, a bar code marking representing the zip code of the addressee must be placed along the bottom edge of the right side of the front envelope face. Typically, this bar code marking is spaced above the bottom envelope edge by a gap of approximately one-eighth of an inch ($\frac{1}{8}$"), and the bar code marking is generally approximately three (3) inches in length.

These marking requirements must be strictly followed, or the mail will be rejected by the Postal Service, requiring hand sorting. Such rejection and hand sorting increases the amount of postage due the Postal Service by the mailing company. The only way for mass-mailers to control postage costs is to obtain the reduced postage rates and sorting advantages provided by adherence to Postal Service bar code placement regulations.

A similar problem arises if a Facing Identification Mark intended to designate the return trip is visible during the initial trip and is detected by a Postal Service optical code reader. The Facing Identification Marks must be visible on the front of the envelope only for the appropriate trip. If not, the inappropriate marks may be detected by optical character readers or bar code readers, and the mail may be lost, delayed, or returned to its origination point.

Finally, prior art envelopes are deficient because the standard, currently-used postal bar code must be printed on the outer paper surface of the envelope. This increases the cost to the mass-mailer of the mailing process since the envelopes must be separately printed with the correct bar code. Further, since the zip code bar code of each customer or addressee is different, to permit two-way use of prior art envelopes, such envelopes would have to be pre-printed with a zip code correct for each particular customer. The cost of such a process is prohibitive. Thus, commercial mass-mailers and others would find useful an envelope having a window in the bar code position specified by the Postal Service, thereby permitting printing the bar code zip code on a sheet or invoice to be inserted in the return envelope and to be visible through the window.

Before the present invention, no prior art envelope had avoided all the foregoing deficiencies.

Therefore, the prior art appears deficient in not providing a two-way reusable envelope having two gummed portions on a top flap, and a covered window disposed to permit a bar code printed on an enclosed sheet to be visible. Therefore, mass-mailing commercial customers, and others, would find useful a two-way window envelope having a foldable flap with two-gummed portions and a covered window adapted to permit a standard postal bar code to be visible on an enclosed sheet.

SUMMARY OF THE INVENTION

Accordingly, one object of the present invention is to provide a two-way reusable commercial mailing envelope provided with a two-fold, perforated closure flap having two gummed portions which are each used for one part of the two-way trip accomplished by the envelope.

A further object of the present invention is to provide a two-way reusable commercial mailing envelope provided with a covered window in the front envelope panel through which a standard postal bar code zip code may be read by currently-used standard automated Postal Service sorting equipment.

Still a further object of the present invention is to provide a two-way envelope including the bar code covered window described above and further including provision for indication of Facing Identification Marks on the closure flap of the envelope.

Other objects and advantages of this invention will become apparent from the following description, taken in conjunction with the accompanying drawings wherein certain embodiments of this invention are set forth, by way of illustration and example only.

DETAILED DESCRIPTION OF THE INVENTION

In the detailed description below, specific terms are used for the sake of clarity. However, the present invention is not limited to the specific terms so selected, and includes all technical equivalents operating in a substantially similar manner to accomplish a substantially similar purpose in a similar way. Thus, the disclosed embodiments described below are merely exemplary of the invention.

Figure 1:
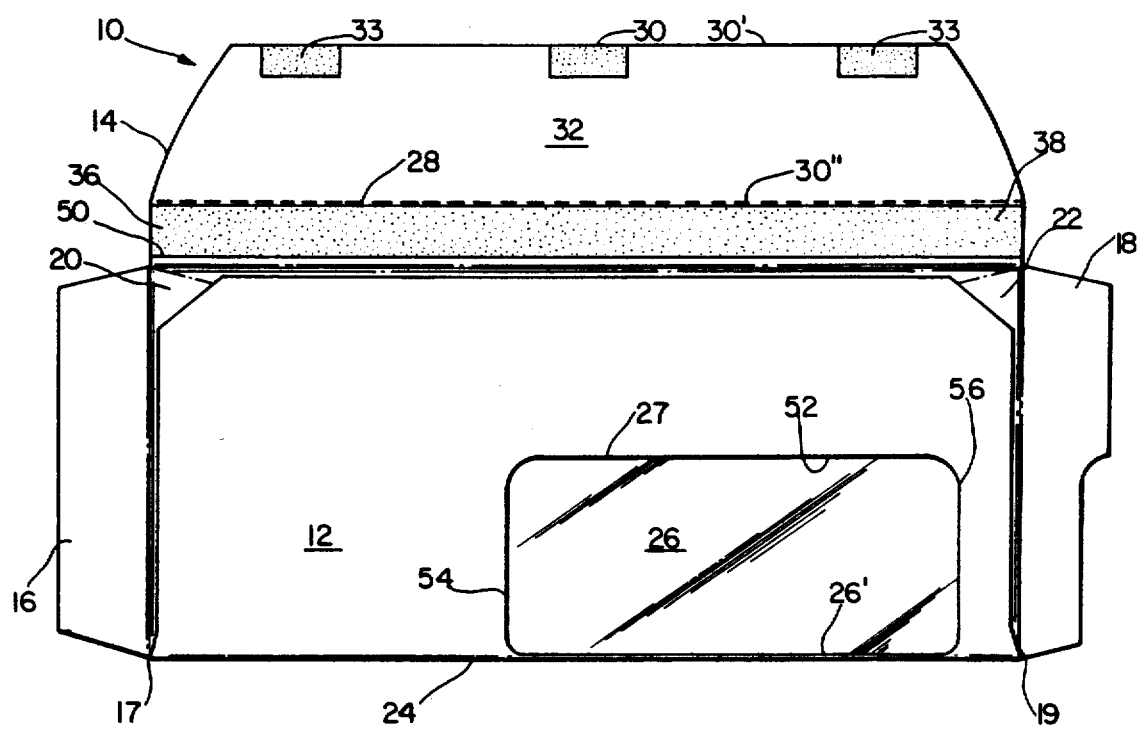
FIG. 1 is a front elevation view of a partly folded envelope according to the present invention.
Figure 2:
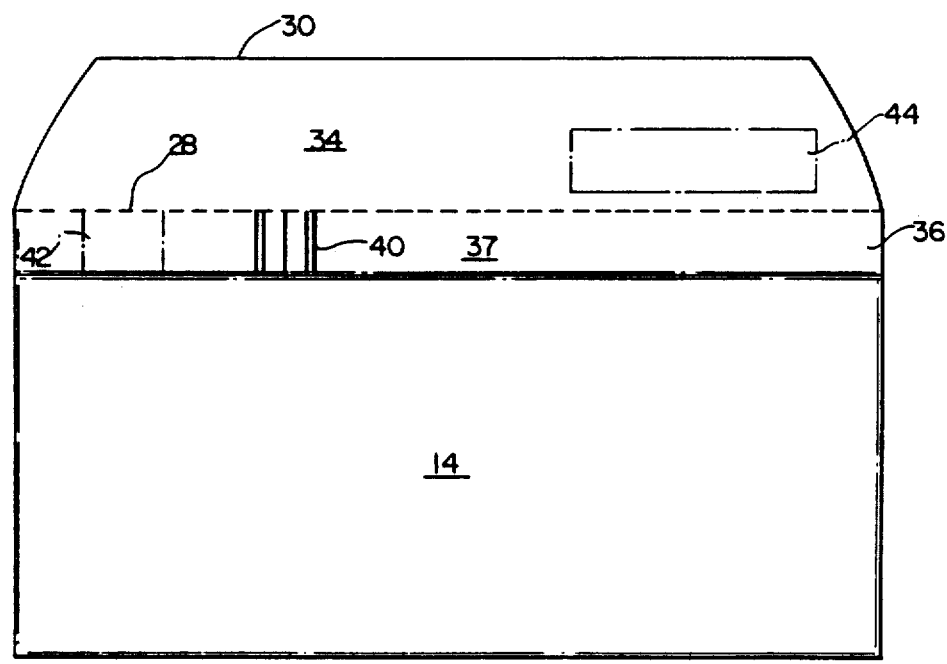
FIG. 2 is a rear elevation view of a partly folded envelope according to the present invention.

Referring now to FIGS. 1 through 5, and specifically to FIGS. 1 and 2, the reference numeral 10 designates a two-way reusable envelope according to the present invention. The envelope 10 includes a substantially rectangular front panel 12, a generally rectangular rear panel 14, and two relatively short laterally extending side flaps 16 and 18. When the envelope is assembled, flaps 16 and 18 are folded along lines 17 and 19, respectively, and flaps 16 and 18 thereby assume folded positions 20 and 22 as shown in FIG. 1. The flaps 16 and 18 are sealed, in positions 20 and 22, to the undersurface of panel 12 using suitable glue or gum.

Figure 3:
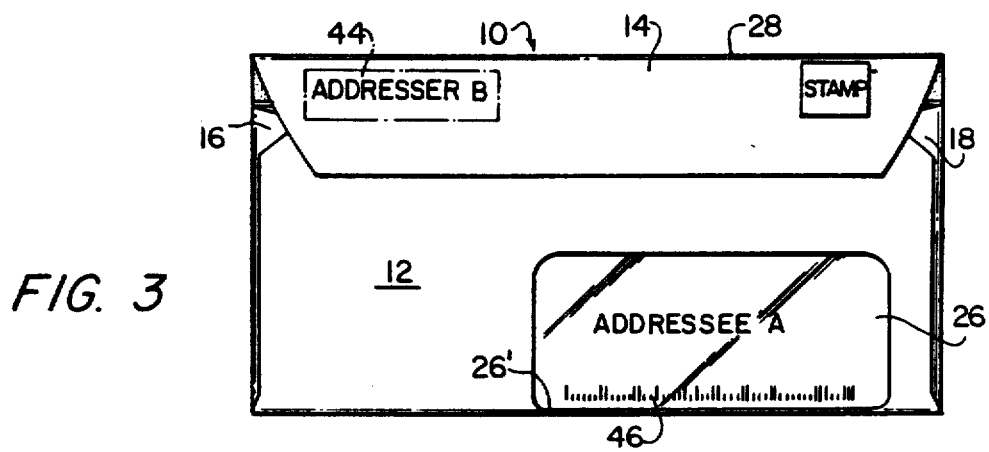
FIG. 3 is a front elevation view of an envelope according to the present invention, shown with panels folded and sealed prior to mailing on a first trip.
Figure 5:
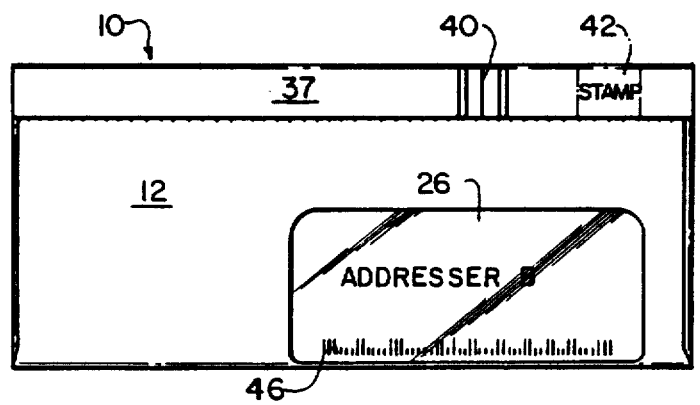
FIG. 5 is a front elevation view of an envelope according to the present invention, showing the closure flap folded and sealed prior to mailing on a second or return trip.

A bar code display window 26 is provided in panel 12 and is positioned along the lower edge 24 of panel 12. The window 26 is substantially rectangular, as defined by cut line 27, and the window 26 is composed of a suitable transparent material such as cellophane glued or otherwise secured in panel 12. Front panel 12 includes a top edge 52, first side edge 54, second side edge 56, and bottom edge 26'. As shown in FIGS. 3 and 5, the positioning of window 26 along bottom edge 24 of panel 12 permits a zip code in bar code format 46 to be visible through window 26.

In prior art envelopes, the bar code 46 is printed on the outer paper surface of a return envelope, below the cellophane window on such an envelope. However, such prior art envelopes are more costly because the envelope must be pre-printed with the bar code. In the present invention, since the bar code is visible through window 26, the bar code may be printed on an invoice or other document on which the address of the sending or receiving party appears. Thus, as shown in FIG. 3, when an envelope 10 is mailed from a commercial company to a customer, the customer's address appears in window 26, through which the customer's bar code format zip code 46 is also visible.

The bar code format zip code 46 may be printed by the same data processing or other equipment used by the company to print the customer invoice. This simultaneous printing of an invoice and bar code dramatically reduces the cost of the overall mailing process, since the company can mail barcoded documents at a postal rate substantially lower than ordinary mass-mailing rates. Further, the company need not pre-print its return envelopes with its return address zip code. The bar code representing the zip code can be placed on an appropriate portion of the invoice, which can then be folded and returned to the company in a window envelope according to the present invention.

As shown in FIG. 5, when the customer desires to return the invoice and other documents in an envelope 10 to the commercial company, the company can provide a pre-printed invoice or other document bearing the bar code format zip code of the company. Thus, when the pre-printed document is inserted into an envelope 10, as shown in FIG. 5, the bar code is visible through window 26.

As shown in FIGS. 1 and 2, rear panel 14 includes a two-portion closure flap blank, divided into a first trip sealing panel or top flap 30 and or second trip sealing panel a middle flap 36. Flap 30 includes an inner face 32 provided with gummed portions 33, and flap 30 has top edge 30' and bottom edge 30''. A perforation line 28 separates flap 30 from flap 36. As shown in FIG. 3, when an envelope 10 is mailed for the first time to a customer, flap 30 is folded along perforation line 28 and sealed to panel 12 using gummed portions 33. The return address of the sending company is placed in space 44, and appropriate postage or a postage meter mark is placed in space 28.

Figure 4:
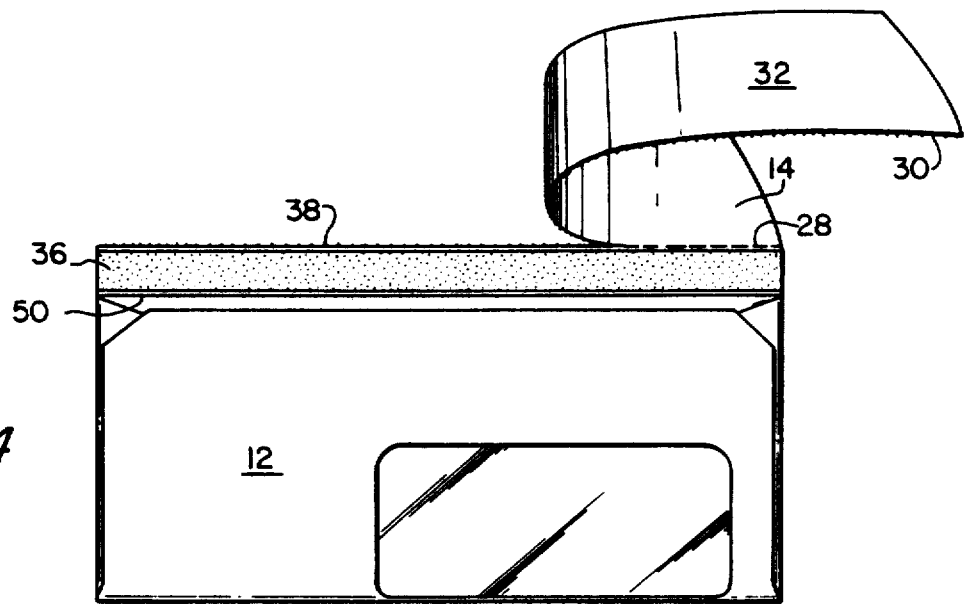
FIG. 4 is a front elevation view of an envelope according to the present invention, showing the top portion of the closure flap partly detached along a perforation line.

As shown in FIGS. 1 and 4, rear panel 14 additionally includes a fold line 50. When the customer desires to open the envelope and return it with appropriate documents to the mailing company, the customer may remove flap 30 by tearing it along perforation line 28, as shown in FIG. 4. Flap 30 is then discarded. The customer may fold flap 36 along fold line 50, and seal it against panel 12 by moistening gummed inner face 38. When flap 36 is sealed against panel 12, its outer face 37 is exposed, as shown in FIG. 5. A pre-printed Facing Identification Mark (FIM) 40 is provided on face 37 and becomes visible when flap 36 is sealed upon panel 12. The customer may then place appropriate postage in space 42 on face 37 and mail the envelope 10 back to the originating company.

The gummed face 38 and gum portions 33 may comprise any suitable adhesion means, including self-adhesive gum, gum requiring moistening for adhesion, or other suitable sealing means.

Thus, as described above, a two-fold flap 30 is provided which ensures that the Facing Identification Mark 40 is invisible until the envelope is mailed back to the originating company. When the envelope is originally sent, as shown in FIG. 3, the address of the customer, the return address of the sending company 44, and the postage stamp or meter mark 28 are the only portions of the envelope 10 visible from the front. Thereafter, when the customer mails the envelope a second time, as shown in FIG. 5, the company return address shows through window 26, and the Facing Identification Mark 40 and postage stamp 42 are visible from the front of the envelope. During both trips, the zip code of the destination in standard postal service bar code format, is visible through window 26.

I claim:

1. A barcode-visible window envelope including a substantially rectangular front panel having a top edge, first and second side edges and a bottom edge, a substantially rectangular window in said panel, said window including a window bottom edge partly coextensive with said front panel lower edge, and further including a facing identification mark printed on said front panel.

2. The envelope of claim 1, further including a substantially rectangular rear panel having a rear panel top edge and a rear panel bottom edge.

3. The envelope of claim 2, further including an elongated closure flap having a gummed inner face, an outer face, and a closure flap bottom edge secured to said rear panel top edge.

4. The envelope of claim 3, further including first and second end flaps secured to and laterally extending from said rear panel.

5. A barcode-visible window envelope including a substantially rectangular front panel having a top edge, first and second edges, and a bottom edge, and further including a substantially rectangular window in said panel, said window having a window bottom edge partly coextensive with said front panel bottom edge, and further including an elongated closure flap comprising:
an elongated middle flap having
a gummed inner face,
an ungummed outer face imprinted with a facing identification mark,
a middle flap fold line and
a perforation line, said perforation line being longitudinally connected to
a first trip sealing panel having a gummed inner face, and an ungummed outer face, a first trip panel top edge and a first trip panel bottom edge,
said first trip panel being longitudinally connected to said middle flap fold line.

6. The envelope of claim 5, further including first and second end flaps secured to and laterally extending from said rear panel.

7. The envelope of claim 6, further including a facing identification mark printed on said outer face.

8. A two-way barcode-visible window envelope comprising:
a substantially rectangular front panel having a top edge, first and second edges, and a bottom edge, and further including a window means in said panel, said window means including a transparent substantially rectangular window having a window bottom edge partly coextensive with said front panel lower edge;
a substantially rectangular rear panel having a rear panel top edge and a rear panel bottom edge;
an elongated closure flap comprising:
an elongated middle flap having
a gummed inner face,
an ungummed outer face imprinted with a facing identification mark,
a middle flap fold line and
a perforation line, said perforation line being longitudinally connected to
a first trip sealing panel having a gummed inner face, and an ungummed outer face; and
first and second end flaps being secured to and laterally extending from said rear panel.

* * * * *